US007721269B2

United States Patent
Cates

(10) Patent No.: US 7,721,269 B2
(45) Date of Patent: May 18, 2010

(54) SYSTEM AND METHOD FOR DETECTING REDUNDANT SUBROUTINE CALLS

(75) Inventor: Claire S. Cates, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 1180 days.

(21) Appl. No.: 11/317,594

(22) Filed: Dec. 23, 2005

(65) Prior Publication Data

US 2007/0150878 A1    Jun. 28, 2007

(51) Int. Cl.
G06F 9/44 (2006.01)
G06F 9/45 (2006.01)
G06F 11/00 (2006.01)

(52) U.S. Cl. .................. 717/133; 717/157; 714/38
(58) Field of Classification Search .......... 717/132–133, 717/154–157; 714/38, 100
See application file for complete search history.

(56) References Cited

U.S. PATENT DOCUMENTS

| | | | |
|---|---|---|---|
| 5,724,590 A | | 3/1998 | Goettelmann et al. |
| 5,732,272 A | * | 3/1998 | Gochee .................. 717/128 |
| 5,828,883 A | * | 10/1998 | Hall ....................... 717/133 |
| 5,963,739 A | * | 10/1999 | Homeier ................ 717/126 |
| 6,560,773 B1 | | 5/2003 | Alexander, III et al. |
| 6,782,462 B2 | | 8/2004 | Marion et al. |
| 7,079,688 B1 | | 7/2006 | Deco et al. |
| 7,093,241 B2 | * | 8/2006 | Huang et al. ........... 717/153 |
| 7,257,692 B2 | | 8/2007 | Schumacher |
| 7,409,679 B2 | * | 8/2008 | Chedgey et al. ....... 717/144 |
| 7,506,319 B2 | * | 3/2009 | Purcell et al. .......... 717/133 |
| 7,509,632 B2 | * | 3/2009 | Boger ..................... 717/133 |
| 2003/0056199 A1 | | 3/2003 | Li et al. |
| 2005/0114843 A1 | | 5/2005 | Gilgen et al. |
| 2005/0183075 A1 | * | 8/2005 | Alexander et al. ..... 717/144 |
| 2005/0235127 A1 | | 10/2005 | Muthiah et al. |
| 2006/0085156 A1 | | 4/2006 | Kolawa et al. |
| 2007/0011428 A1 | | 1/2007 | Kurtz |
| 2007/0169051 A1 | * | 7/2007 | Krauss ................... 717/154 |

OTHER PUBLICATIONS

Spivey, J.M., "Fast, accurate call graph profiling", Software Practice and Experience, 2004, vol. 34, Issue 3, p. 249-264.*

(Continued)

*Primary Examiner*—Wei Y Zhen
*Assistant Examiner*—Ryan D Coyer
(74) *Attorney, Agent, or Firm*—Jones Day

(57) ABSTRACT

A system and method of detecting redundant subroutine calls in a software system is provided. Call path data is obtained for the software system and stored into a call tree comprising a plurality of nodes, each node representing a software routine of the software system, the call tree describing the calling paths between the plurality of software routines. At least one focal node is identified among the plurality of nodes in the call tree for redundancy analysis. The calling redundancy to the focal node is analyzed by determining a common ancestor node list for the focal node and by generating call path data for each of the common ancestor nodes on the list. The common ancestor list data may be sorted and call trees generated for the common ancestors in relation to the focal node. This data may then be displayed on a graphical user interface for redundancy analysis of the focal node.

27 Claims, 10 Drawing Sheets

OTHER PUBLICATIONS

Xie et al., "An Empirical Study of Java Dynamic Call Graph Extractors", Univ. of Wash. CSE Technical Report, Feb. 12, 2003, p. 1-11.*

OC Systems Aprobe Technology, http://www.ocsystems.com/tech_aprobe.html, 2 pp.

OC Systems, RootCause Speeds Resolution of Performance Bottlenecks, Memory Leaks and . . . , http://www.ocsystems.com/prod_rootcause.html (2 pp.).

OC Systems SAS RootCause Client Profile, http://www.ocsystems.com/casestudy_sas.html, 2 pp.

Hitchhiker Lifecycle Application Diagnostics for C/C++, http://www.ocsystems.com/eclipse/index.html, 2 pp.

Undated paper entitled "How's Your Memory" by Claire Cates at SAS (10 pp.).

Ammons, Glen et al., "Finding and Removing Performance Bottlenecks in Large Systems", undated, 26 pp.

Ayers, Andrew et al., "TraceBack: First Fault Diagnosis by Reconstruction of Distributed Control Flow", PLDI '05, pp. 201-212 (Jun. 12-15, 2005).

Begic, Goran, "An introduction to runtime analysis with Rational PurifyPlus", Nov. 19, 2003, 11 pp.

Chilimbi, Trishul M. et al., "Low-Overhead Memory Leak Detection Using Adaptive Statistical Profiling", ASPLOS '04, Oct. 9-13, 2004, pp. 156-164.

Cole, Oliver, "Aprobe: A Non-intrusive Framework for Software Instrumentation", OC Systems, Inc., pp. 1-10.

Jump, Maria et al., "Cork: Dynamic Memory Leak Detection for Java", Technical Report TR-06-07, Jan. 2006, 10 pp.

Pevzner, P.A. et al., "Multiple Filtration and Approximate Pattern Matching", Algorithmica, 13, pp. 135-154 (1995).

Williams, Amy Lynne, "Static Detection of Deadlock for Java Libraries", Massachusetts Institute of Technology, 67 pp. (2005).

* cited by examiner

SYSTEM AND METHOD FOR DETECTING REDUNDANT SUBROUTINE CALLS

BACKGROUND

1. Technical Field

The technology described in this patent application is generally directed to the field of software performance analysis and diagnostics. More specifically, the technology provides a system and method for detecting redundant subroutine calls in software applications.

2. Description of the Related Art

Complex software applications typically comprise hundreds or even thousands of subroutines or functions, each of the subroutines typically performing a particular function or set of functions. The subroutines of the software application communicate with one another by calling one another in a variety of distinct calling paths. A call path is a communication path between two or more subroutines. Oftentimes, the calling paths in complex applications can become redundant as between two subroutines, meaning that there are several communication paths between the subroutines.

In order to visualize theses calling paths, a call tree is often developed. The call tree is a tree representation of all the software subroutines that are called while a program is executing. Within the call tree, each subroutine is represented by a node, and links between the nodes represent call paths. Several commercially available software performance analysis and diagnostic tools are available that can generate such a calling tree, such as Rational Quantify™ and Intel Vtune™, for example. This call tree data can be expressed as: (i) routine x was called; (ii) routines a and b called x; (iii) routine x calls routines c, d, and e; and (iv) repeat the above sequence (i)-(iii) for each routine in the call path.

By using this call tree data, a complete call path for every routine of the program under analysis can be generated. The number of times that a routine is called, and how often it is called within a particular call path may also be generated along with the call tree data. By analyzing the data in the call tree, a performance analyst may be able to identify a performance bottleneck.

FIG. 1 is an example call path diagram 10 showing the execution path between four functional software routines or nodes of an exemplary computer program. In this diagram, the four nodes—afoo 12, bfoo 14, cfoo 16, and foo 18—communicate with one another through a particular set of execution paths. In this example, the software routine afoo 12 makes a direct call to bfoo 14, cfoo 16 and foo 18. In addition, the routine bfoo 14 makes a direct call to foo 18 and cfoo 16, which in turn makes another direct call to foo 18. Thus, the routine afoo 12 makes four calls to the routine foo 18, one direct call, and three indirect calls through the functions bfoo 14 and cfoo 16. This relationship between afoo and foo is generally termed redundant because of the plurality of calling paths between the two functions.

Upon determining the redundant relationship between afoo 12 and foo 18, a performance analyst may determine that a majority of the execution time was spent in foo 18, and then a software developer may attempt to rewrite the foo 18 routine to make it faster. Alternatively, the software developer may change afoo 12 to call foo 18 only once, and then cache the data returned therefrom and pass it along to bfoo 14 and cfoo 16 so as to eliminate the need for these routines to make another call to foo 18, thereby eliminating any redundancy.

Although this may seem like a straightforward approach to fixing the performance problem, in reality these redundant situations are very difficult to detect and diagnose using the commercially available performance analysis tools. Because a typical software application may have hundreds or more of inter-related routines, the resulting calling path data and call trees may become extremely difficult to analyze. Moreover, in determining how a particular function is performing, it is necessary to understand and analyze the calling path of any parent functions. The commercially available tools do not provide sufficient intelligence or functionality to enable this type of problem to be diagnosed by the performance analyst or the software developer.

SUMMARY

A system and method of detecting redundant subroutine calls in a software system is provided. Call path data is obtained for the software system and stored into a call tree comprising a plurality of nodes, each node representing a software routine of the software system, the call tree describing the calling paths between the plurality of software routines. At least one focal node is identified among the plurality of nodes in the call tree for redundancy analysis. The calling redundancy to the focal node is analyzed by determining a common ancestor node list for the focal node and by generating call path data for each of the common ancestor nodes on the list. The common ancestor list data may be sorted and call trees generated for the common ancestors in relation to the focal node. This data may then be displayed on a graphical user interface for redundancy analysis of the focal node.

DETAILED DESCRIPTION

Figure 1:
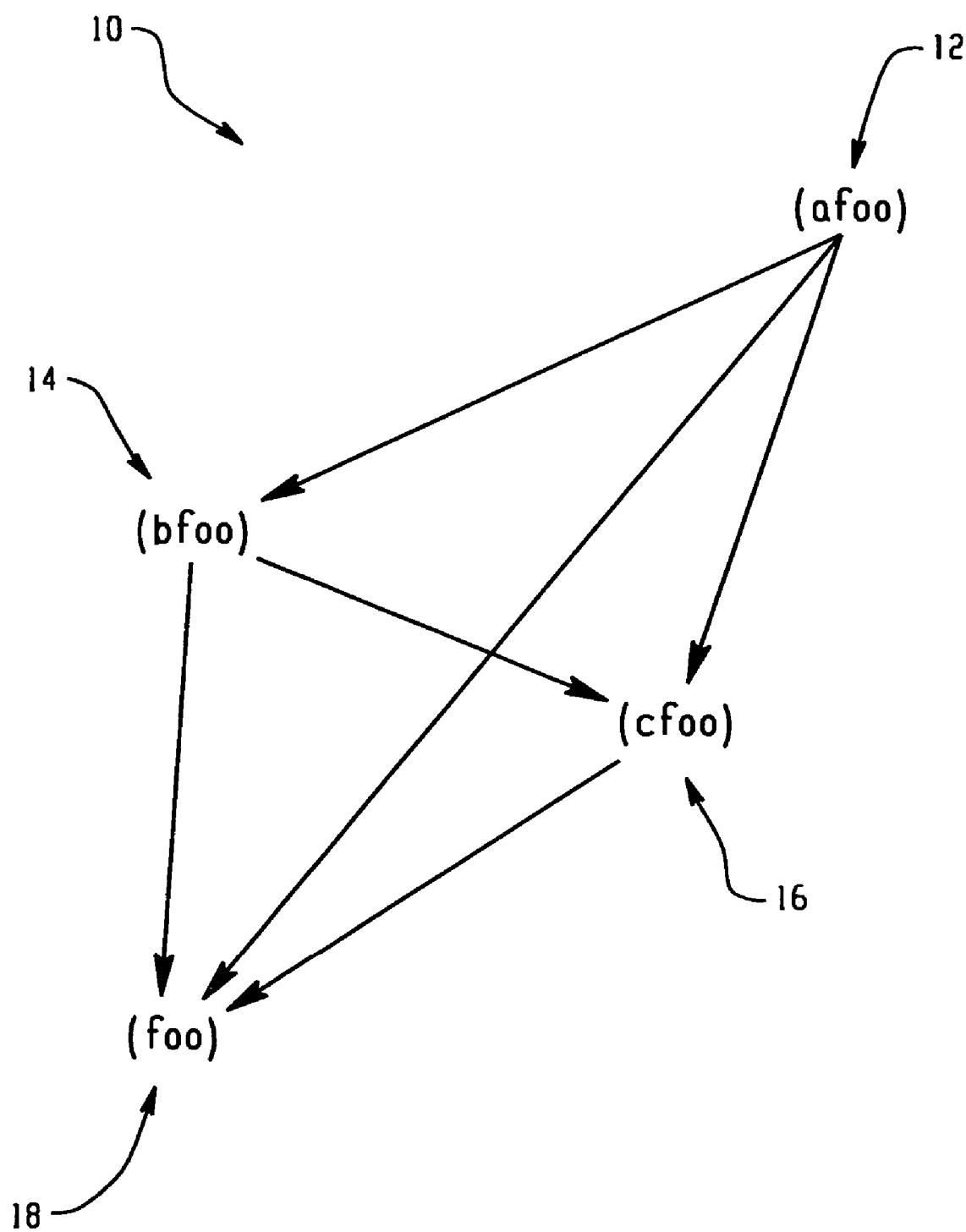
FIG. 1 is an example call path diagram showing the execution path between four functional software routines or nodes.
Figure 2:
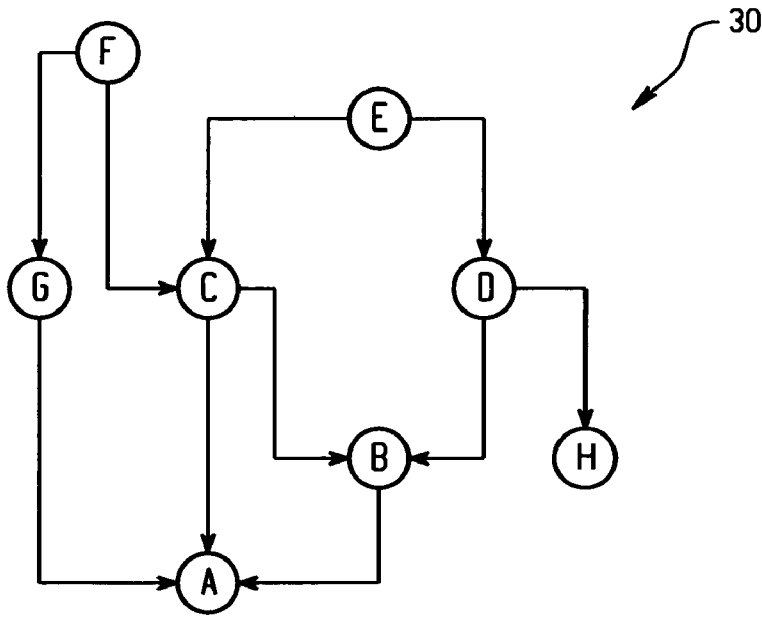
FIG. 2 is an example node traversal diagram showing a call tree and a method for traversing the nodes of the call tree.

Turning now to the remaining drawing figures, FIG. 2 is an example node traversal diagram 30 showing a call tree and a method for traversing the nodes of the call tree. In this example, there are eight nodes in the call tree, labeled A through G. The node A is termed the "focal node" in this diagram because it is the node currently under analysis for any redundancy. The "parent tree" of focal node A is shown in FIG. 2, which graphically depicts the full call paths of the nodes calling into the focal node. A "parent node" is a node in the call tree that calls a particular node under consideration, and a "child node" is a node that is called by a particular node under consideration. Other familial relationships apply to the description of the call tree as well. For example, nodes G, C and B are the parent nodes to the focal node A and thus the focal node A is the child node to nodes G, C and B. Node F is a parent node to nodes G and C, and thus it is a grandparent node to node A.

A methodology of traversing the calling paths in a call tree is termed a "node traversal function." The node traversal function provides a mechanism for tracing all of the possible paths from the focal node to the remaining nodes in the call tree to thereby determine which functions are calling the focal node, and through what paths that function is being called. An example of such steps is shown in table 32 of FIG. 2, which lists an exemplary series of steps for tracing the call paths from the focal node A to the other nodes in the call tree.

Figure 3:
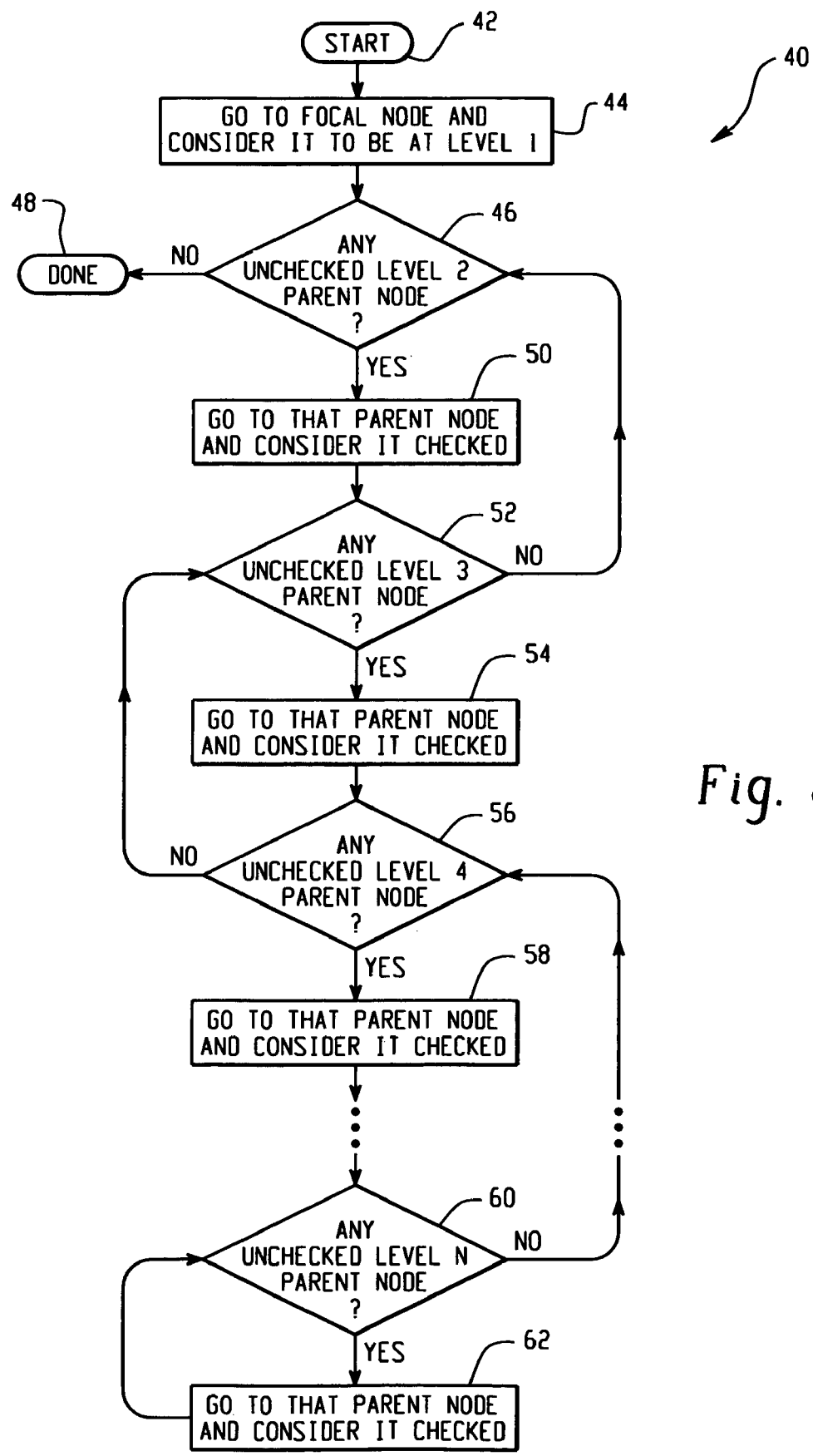
FIG. 3 is an example flow chart describing the method for traversing the nodes of the call tree shown in FIG. 2.

FIG. 3 is an example flow chart describing a method 40 for traversing the nodes of the call tree shown in FIG. 2. The method begins at 42. The method is initialized at step 44, in which a level variable of the focal node is set to a level of 1. The level variable for each node is used as a measure of the distance between any two nodes. The focal node is assigned a level of 1. Parent nodes to the focal node, therefore, have a level of 2. The parent nodes to the parent nodes of the focal node have a level of 3, and so forth. Step 46 checks to determine if there are any unchecked level 2 parent nodes to the focal node. Initially, there must be at least one such node to check. If there are no unchecked level 2 parent nodes, then the method ends at 48. If there are remaining level 2 parent nodes to be checked (i.e., call paths to the focal node to be traversed), however, then control passes to step 50.

At step 50 the method proceeds up the call tree to the next unchecked level 2 parent node, at which point that node is considered checked. From this level 2 node, the method proceeds to conduct one or more checks of any level 3 parent nodes in step 52 that are related to the current level 2 node. If, in step 52, there are no additional level 3 parent nodes to check with respect to the current level 2 node, then control passes back to step 46 to proceed on to the next level 2 parent node, if one exists. If, however, there are remaining level 3 parent nodes to check with respect to the current level 2 node, then control passes to step 54 in which the current level 3 parent node is flagged as checked. This process of checking each node at each level for additional parent nodes at higher levels continues through steps 56, 58, 60 and 62 until all N levels of the call tree are traversed and thereby checked for related nodes at different levels of the tree structure.

Table 32 of FIG. 2 shows a typical node traversal path using the methodology described in FIG. 3. The process begins at the focal node A. From here, the method traces a path up to node G, which is a level 2 parent of node A. From node G, the method then continues the path up to node F, which is a level 3 parent of node A. Node F has no level 4 parents, and thus the method returns back to node G. This node has no additional parents, other than node F, and therefore the method returns back to node A. From here, the method then traces another path from node A up to node C, which is the second level 2 parent of node A. From node C the method then proceeds to node F, a level 3 parent of node A, and then returns to node C because node F has no parent nodes. Similarly, the method then proceeds to node E from node C, and then back to node C and then back to node A. The remaining paths from node A up through the four sub-paths defined by (1) nodes B, C, and F; (2) nodes B, C and E; (3) nodes B, D, and E; and (4) nodes B and D follow a similar logical flow.

Figure 4:
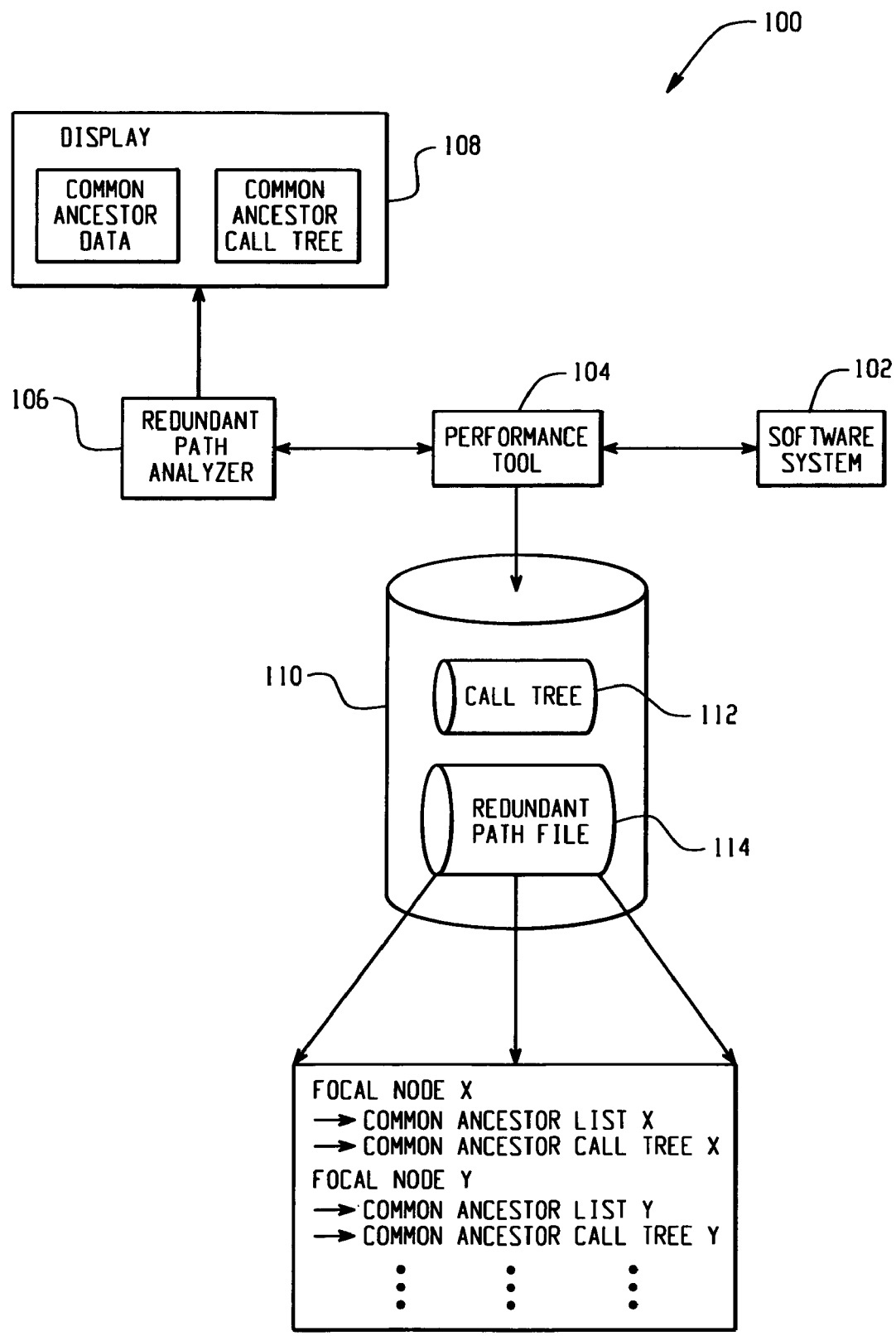
FIG. 4 is a block diagram of an example system for detecting redundant subroutine calls.

FIG. 4 is a block diagram of an example system 100 for detecting redundant subroutine calls. The system 100 may include a redundant path analyzer component 106, a display 108, a performance tool 104, and a data store 110. Although shown separately, the redundant path analyzer 106 may, alternatively, be integrated with the performance tool 104. The system for detecting redundant subroutine calls operates on a software system under test 102, which is the software application being evaluated for redundant subroutine calls.

In this example system 100, the performance tool 104 is utilized to analyze the calling path data of the software system 102 under test, and to generate a call tree 112 thereof. The call tree 112 is preferably stored in the data store 110 for subsequent access and analysis. The redundant path analyzer 106 is a software component that receives the call tree data 112 generated by the performance tool, and generates a redundant path file 114 therefrom. The redundant path file 114 includes, for each focal node analyzed by the redundant path analyzer 106, a common ancestor list and a common ancestor call tree.

A common ancestor to the focal node is a routine that calls the focal node through at least two different call paths. For example, as shown in FIG. 2, the node E is a common ancestor to the focal node A because it calls A indirectly through three separate call paths, E-C-A; E-C-B-A; and E-D-B-A.

In addition to storing the redundant path file data 114 in the data store 110, the redundant path analyzer 106 may also provide the common ancestor list and the common ancestor call tree data to the display 108 in the form of a tabular and/or graphical depiction. In this manner, a performance analyst or software programmer can visualize the common ancestor nodes of the focal node being analyzed, and can also visualize the call tree depicting the calling paths from those common ancestor nodes to the focal node. Using this visual cue, the analyst or programmer can more easily determine performance bottlenecks in the software system 102 under test and may then be able to enhance the performance of the program 102.

Figure 5:
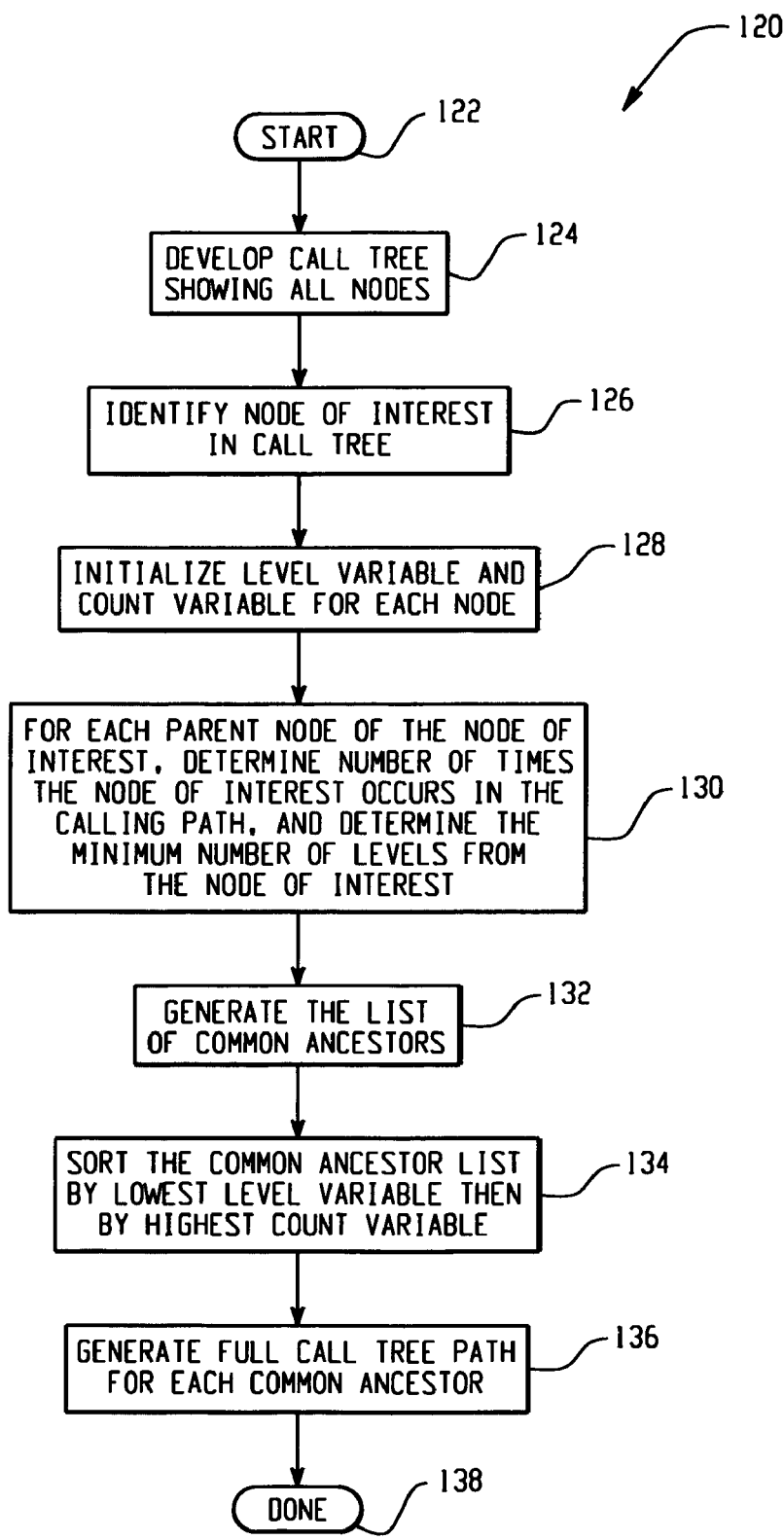
FIG. 5 is a flow chart describing an example method for detecting redundant subroutine calls.

FIG. 5 is a flow chart describing an example method 120 of detecting redundant subroutine calls using, for example, the system of FIG. 4. The method begins at 122. From here, a call tree is developed in step 124 detailing the calling path relationships between a plurality of the functional nodes in the software system under test 102. The call tree is developed using, for example, the methodology described in FIGS. 2-3, above. This call tree data may be stored in a data store 110 for later use by the method. The call tree may be generated by a performance tool 104, or it may be generated by the redundant path analyzer 106.

In step 126, the method identifies a particular subroutine as the focal point or focal node of interest. This focal node is identified for further analysis in steps 128 through 136. The focal node may be identified in a number of ways. First, a performance analyst operating the redundant path analyzer program 106 may select the focal node of interest for analysis. Alternatively, the focal node may be selected automatically by the computer as part of a system analysis of each node in the system, or as part of an analysis of some subset of all the functional nodes in the system that the computer has identified as being called in a potentially redundant manner. In this later implementation, the redundant path analyzer 106 may examine the nodes of the software system 102 that are being called from multiple other nodes and then automatically subject each of these nodes to the methodology set forth in FIG. 5.

Following identification of the focal node, the method then initializes the level variable and count variable for each node in the call tree in step 128. The level variable has been described previously as a measure of the nodal distance from the focal node to the node under analysis. In step 128, the level variable is further defined as the lowest level from the focal node to where a particular node of interest under review is found in the calling paths. Thus, if a particular node under analysis is a parent node of the focal node via a first call path, but it is also a grandparent node, then it would be assigned the lower level value of 2 associated with the parent node. The count variable is assigned a value corresponding to the number of times that a subroutine (node) was identified in a calling path. The default value of the count variable is preferably zero.

Following initialization of the node variables, in step 130 the method then proceeds to determine, for each parent node of the focal node, the number of times that the focal node occurs in the calling path under analysis and the minimum number of levels each parent node is away from the focal node. This step 130 is further described below in reference to FIG. 6. Having analyzed all of the parent nodes in each call path to the focal node in step 130, the method then proceeds to generate a list of common ancestors in step 132. This step 132 is further described below with reference to FIG. 7. This common list of ancestors is then sorted in step 134, first by the lowest level variable, and then by the highest count variable. Finally, in step 136, the method generates a full call tree for each of the common ancestors identified in step 132. The common ancestor list and the common ancestor call tree data may then be stored to the data store 110, and the analysis depicted in FIG. 5 may repeat for additional focal nodes of interest in the software system 102 under review.

Figure 6:
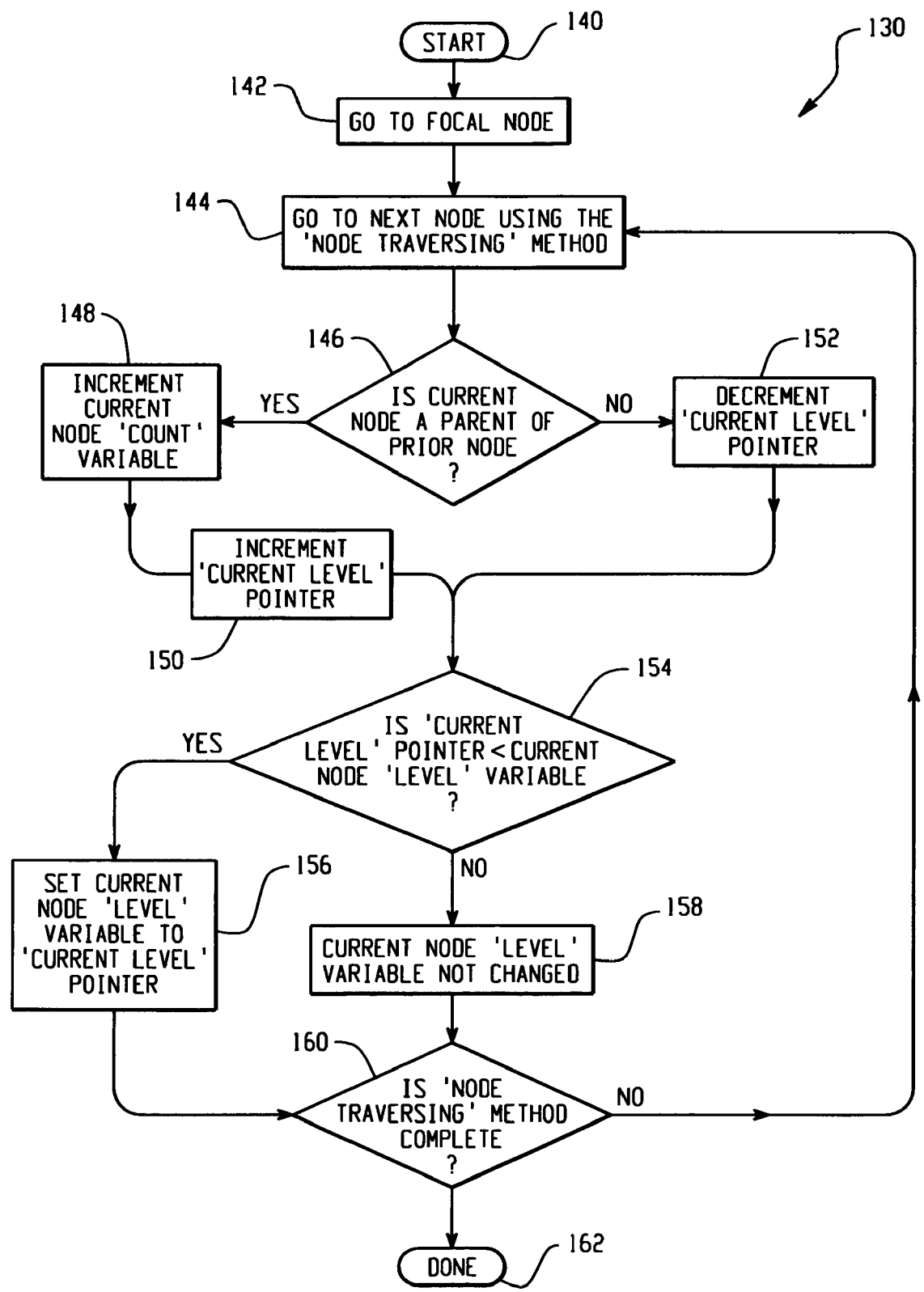
FIG. 6 is an expanded flow chart describing step 130 of FIG. 5.

FIG. 6 is an expanded flow chart describing step 130 of FIG. 5, in which for each parent node to the focal node, two determinations are made: (1) the number of times that the focal node occurs in the calling path to the parent node; and (2) the minimum number of levels from the focal node to the parent node. Step 130 begins at sub-step 140. From here, the method progresses to the focal node under analysis and the initial level variable is set to 1. Using the node traversal method, such as shown in FIGS. 2-3, each parent node to the focal node is then visited for at least several levels of the call tree, preferably stopping at a top level value of between 5 and 10 levels away from the focal node. Allowing the method to progress more than 5 to 10 levels away from the focal node is usually unnecessary, because it becomes more difficult to fix any redundancies at these level distances from the node of interest. Optionally, the operator of the redundant path analyzer 106 may specify the top level value for a particular analysis.

Subsequently, step 144 progresses to the next parent node to the focal node. This is now the current node under analysis. If the current node is determined to be a parent of the prior node under analysis in step 146, then the count variable of the current node is incremented in step 148 and a current level pointer is incremented by one in step 150, else in step 152 the current level pointer is decremented by one. Control of the method then proceeds to step 154, in which the current level pointer is compared to the current level variable of the node under analysis. If the current level pointer is less than the current level variable, then in step 156 the current level variable is set to the current level pointer. Otherwise the current level variable remains unchanged in step 158, and control passes to step 160, which loops back to step 144 to analyze the next node if the node traversal method is not completed. After step 130 is completed, each node in the call tree will be assigned two variables—a level variable and a count variable. This data is subsequently used in steps 132-136 of the method to generate the common ancestor call list and the common ancestor call trees.

Figure 7:
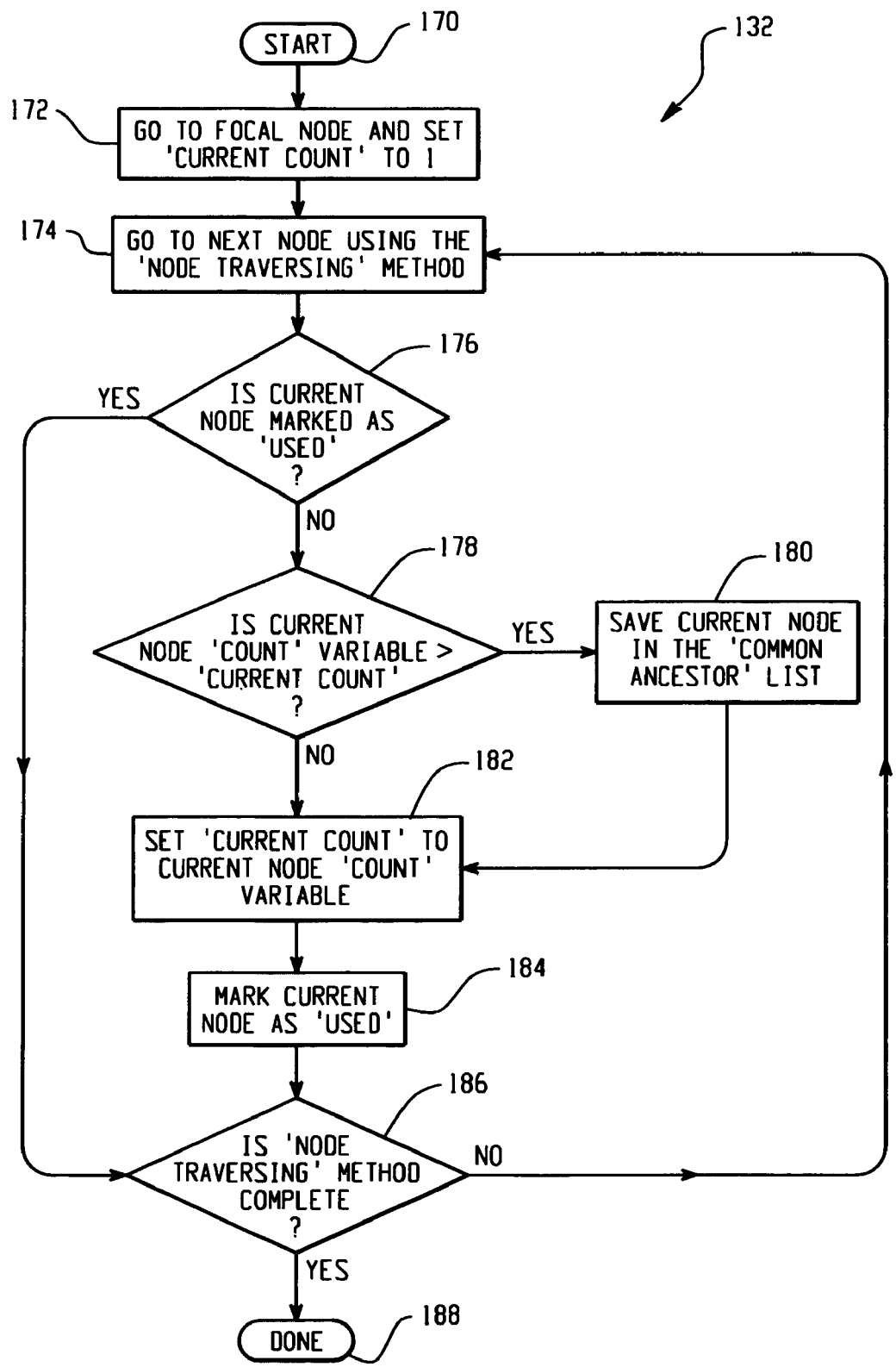
FIG. 7 is an expanded flow chart describing step 132 of FIG. 5.

FIG. 7 is an expanded flow chart describing step 132 of FIG. 5, the step of generating the list of common ancestors to the focal node. The method begins at 170. Starting at the focal node, a value termed "current count" is set equal to one. Using the node traversal method discussed previously, steps 174-186 are executed by visiting each call path of the call tree from the focal node. In step 174, the next node of the node traversal method is visited for analysis. If the current node is marked as used in step 176, then control passes to step 186 which determines whether the node traversing method is complete. If the node traversing method is complete in step 186, then the step 132 ends at 188, otherwise control passes back to step 174 to iterate to the next node for analysis.

If the current node was not marked as used in step 176, then at step 178 the method determines whether the count variable associated with the current node is greater than the "current count" value initialized in step 172. If the determination in step 178 is positive, then at step 180 the current node, and its level variable, is saved in the common ancestor list of the focal node being analyzed. After step 180 is complete, and also if the determination of step 178 is negative, then at step 182 the "current count" value is set to the count variable associated with the current node. The current node is marked as used in step 184, and then the method determines whether the node traversing method is complete in step 186. If the traversing method is complete, then the step 132 ends at 188, otherwise the process loops back to step 174 to process the next node in the call path.

Figure 8A:
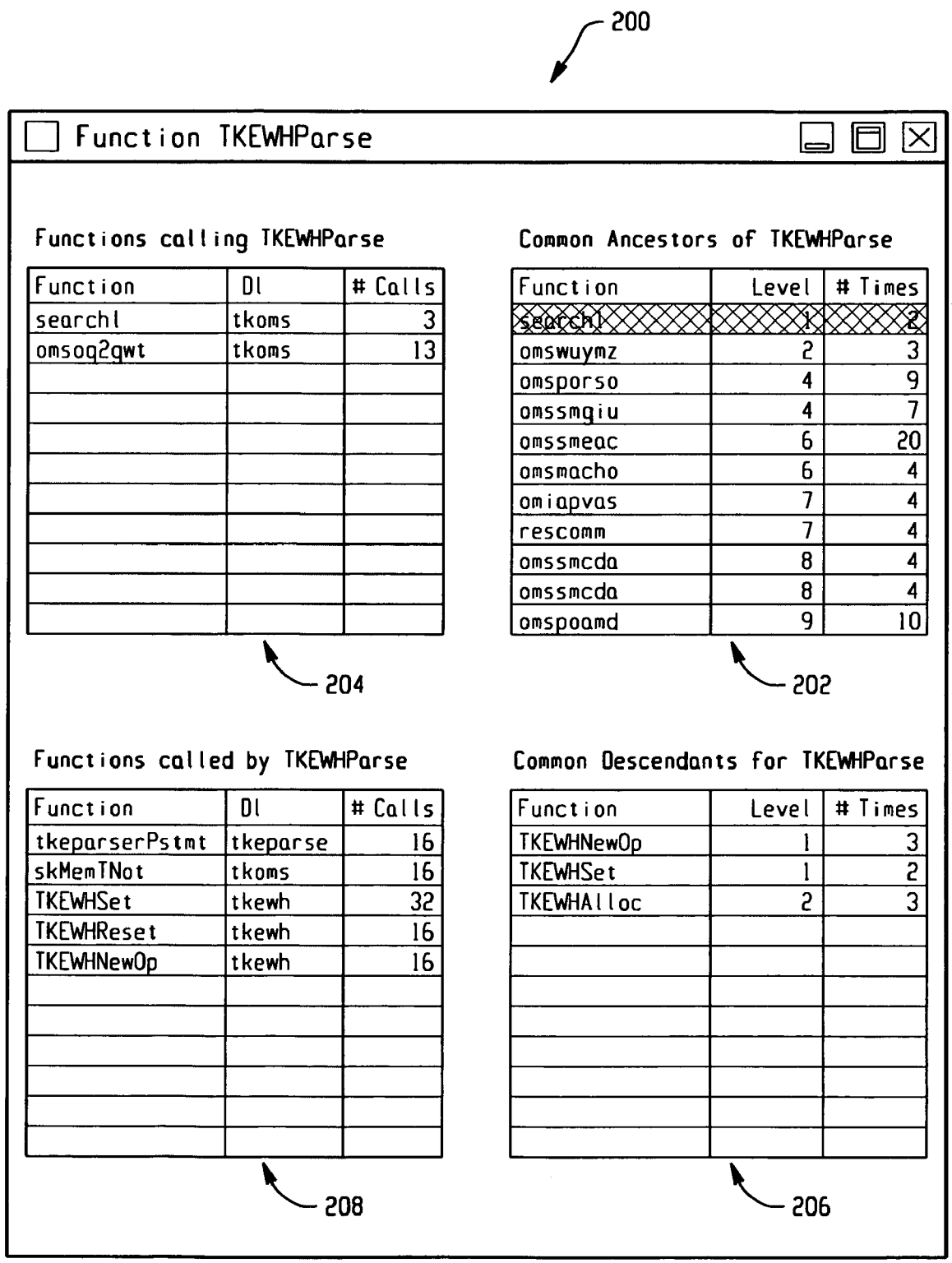
FIG. 8A is a graphical depiction of an example screen display showing a list of common ancestors for a selected focal node in a call tree.

FIG. 8A is a graphical depiction of an example screen display 200 showing a list of common ancestors for a selected focal node in a call tree. Here, the selected focal node is termed TKEWHParse. The graphical display 200 is configured into four panes, a first pane 204 which details the subroutines making a direct call to the focal node, a second pane 202 which lists the common ancestors of the focal node as determined in step 132 of FIG. 5, a third pane 208 detailing the subroutines that are called by the focal node, and a fourth pane 206 detailing the common descendants of the focal node. Within the common ancestor list pane 202, the subroutines are sorted first by the level variable, with the lowest level being at the top of the list, and then secondarily by the count variable. So, for example, the functions "omssmeac" and "omsmacho" both have a level value of 6, but the count value of "omssmeac" is much greater then "omsmacho," and therefore it is placed above that function on the common ancestor list. The common ancestor list is sorted in this manner because it is likely that the functions that are easiest to fix (or otherwise make more efficient) are those with the lowest level value and the highest count value. For these functions, the performance analyst (or the programmer), may determine that the redundancy of the multiple calls to the focal node may be minimized by calling the focal node routine once and cacheing the data for the calling nodes.

Figure 8B:
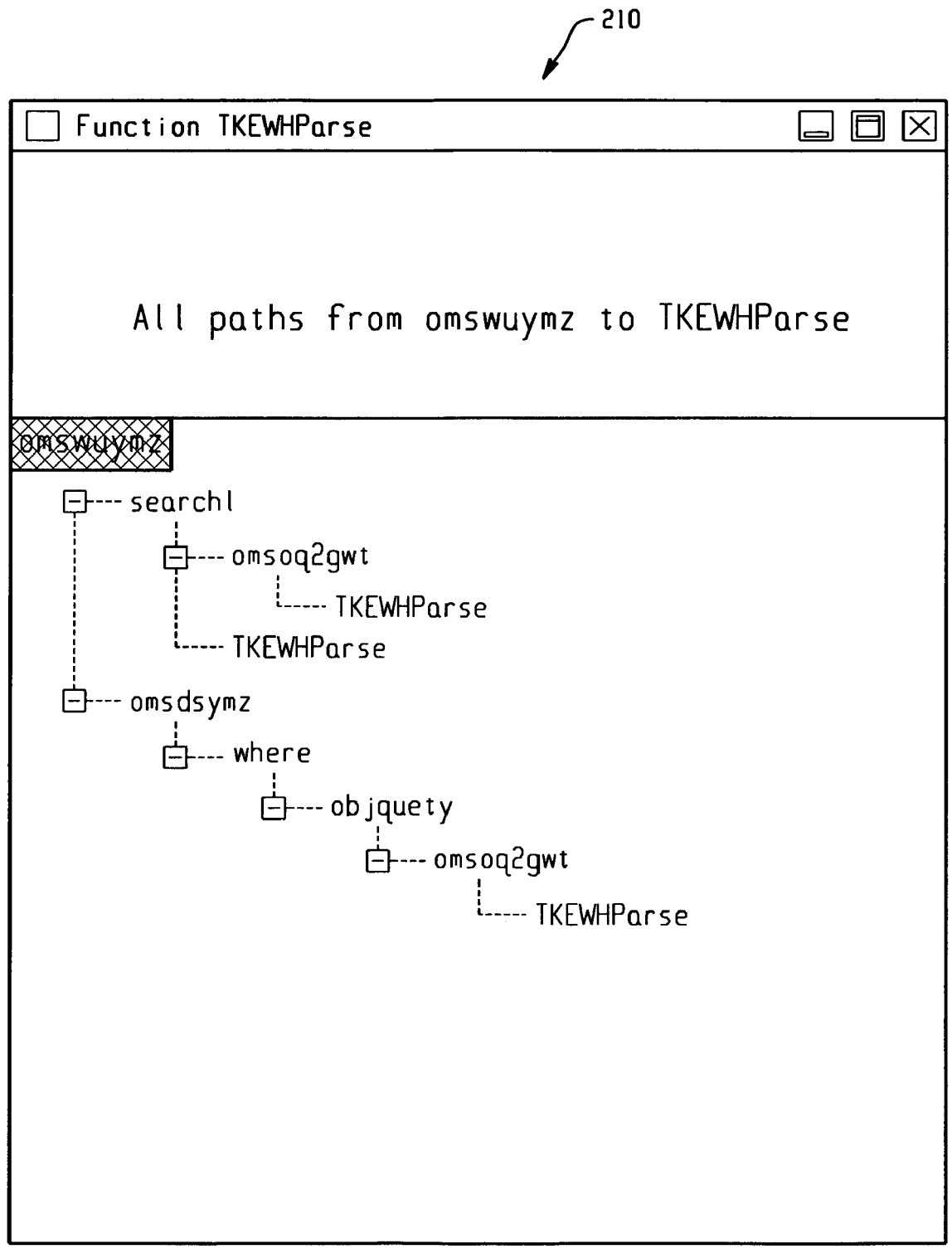
FIG. 8B is a graphical depiction of an example screen display showing a common ancestor call tree for a selected common ancestor of the focal node from FIG. 8A.

FIG. 8B is a graphical depiction of an example screen display 210 showing a common ancestor call tree for a selected common ancestor of the focal node from FIG. 8A. As described above in step 136 of FIG. 5, for each of the common ancestors identified in step 132, a full call tree is generated from the common ancestor node to the focal node. This call tree data, along with the common ancestor node list may be saved to the data store 110 for subsequent analysis by the performance analyst or programmer. In FIG. 8B, one of the common ancestor nodes in FIG. 8A has been selected for display. Here, the focal node is still the subroutine TKEWHParse and the selected common ancestor is the subroutine "omswuymz," which is the second node listed in the common ancestor pane 202 of FIG. 8A. The graphical depiction of the call tree shown in FIG. 8B demonstrates that the common ancestor node "omswuymz" calls the focal node subroutine three times, all of which are indirect calls through other subroutines. Hence, the count value associated with "omswuymz" is three. The level value of this subroutine is 2, which represents the shortest indirect calling path between the two nodes. Here, that path is through the function "search1." The performance analyst may then print out the graphical depiction of the common ancestor call path shown in FIG. 8B and work with the programmer to determine whether or not the redundant calling of TKEWHParse from "omswuymz" can be improved. This process of visualizing, printing, and then analyzing the common ancestor call tree data may then proceed for each of the common ancestor nodes identified in step 132 so as to detect and then improve upon the redundancy of the calling paths between the various subroutines of the software system under analysis.

Figure 9A:
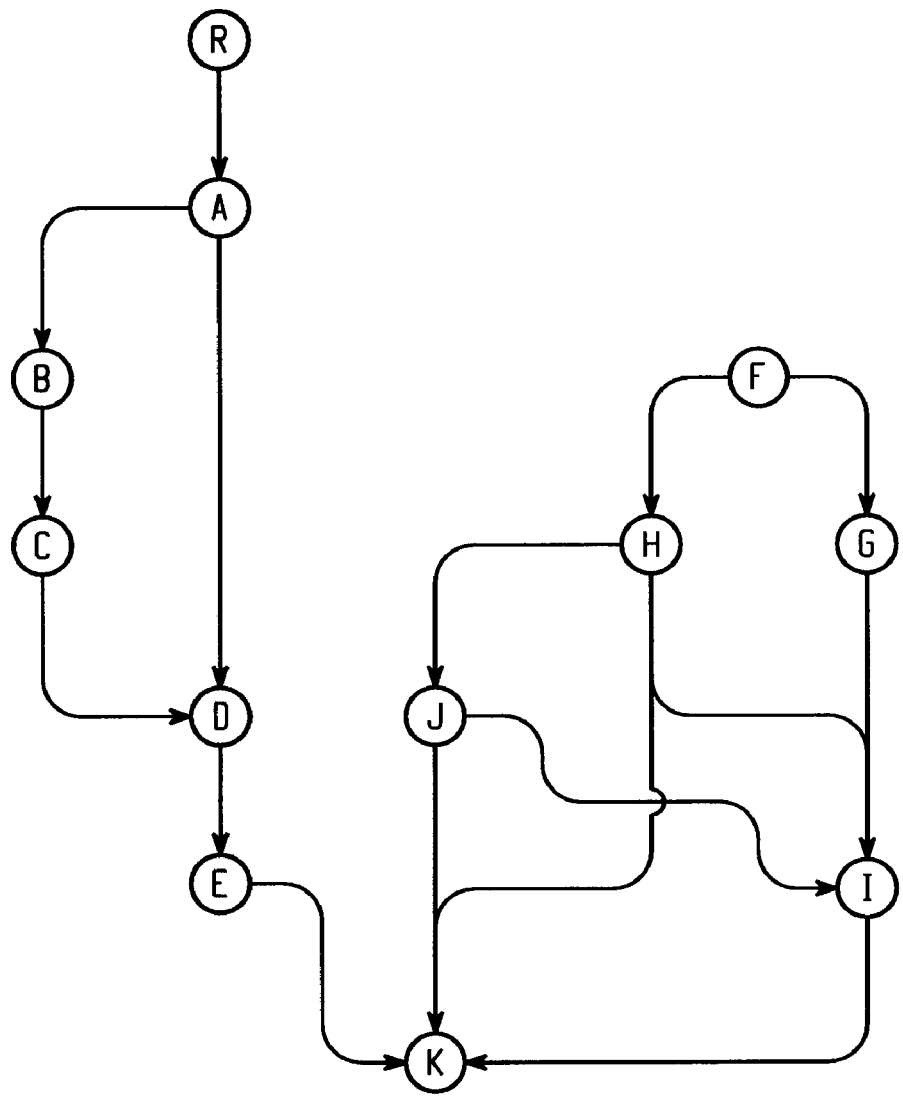
FIG. 9A is another example call tree.

FIG. 9A is another example call tree having functional nodes A-K and R. Here, the functional node K has been selected as the focal node for further analysis of redundant calling paths. Following the methodology of FIGS. 5-7, the call tree is traversed a first time in order to determine the level and count variables for each of the calling nodes. In this case, the following data results from this first node traversal:

| NODE | LEVEL | COUNT |
|------|-------|-------|
| A    | 3     | 2     |
| B    | 4     | 1     |
| C    | 3     | 1     |
| D    | 2     | 1     |
| E    | 1     | 1     |
| F    | 2     | 5     |
| G    | 2     | 1     |
| H    | 1     | 4     |
| I    | 1     | 1     |
| J    | 1     | 2     |
| R    | 4     | 2     |

Figure 9B:
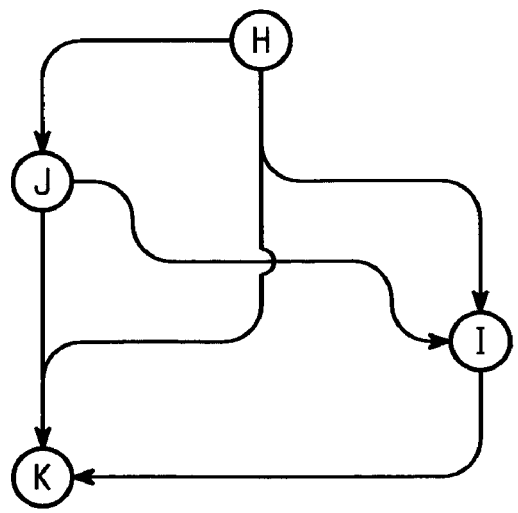
FIG. 9B is an example of a common ancestor call tree.

During the second traversing of the call paths in step 132 of FIG. 5 (as further explained in the description of FIG. 7), the common ancestor list is generated. In this example, this second traversal of the call tree results in the following nodes being identified as the common ancestors of node K: F[5:2]; H[4:1]; J[2:1]; and A[2,3], where node[x:y] is the node listing, x is the count variable, and y is the level variable for each node. Subsequently, in step 134 of FIG. 5, the common ancestor call list is sorted first by the lowest level variable and then by the highest count variable within each level, resulting in the following sorted common ancestor list: H[4:1]; J[2:1]; F[5:2]; and A[2:3]. For each of these common ancestors of the focal node K, a common ancestor call tree is then generated, such as shown in FIG. 9B. FIG. 9B is an example of a common ancestor call tree for the common ancestor node H showing the four call paths that exist between this node and the focal node K.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data or other forms of data elements) may be stored as one or more data structures in computer memory and/or storage depending upon the application at hand. The systems and methods may be provided on many different types of computer readable media including instructions being executable by a computer to perform the system and method operations described herein.

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

What is claimed is:

1. A computer-implemented method of detecting redundant subroutine calls in a software system, comprising:
   obtaining, using one or more processors, call path data for the software system and storing the call path data into a call tree comprising a plurality of nodes, each node representing a software routine of the software system, the call tree describing the calling paths between the plurality of software routines;
   identifying at least one focal node among the plurality of nodes in the call tree;
   determining a list of common ancestor nodes for the focal node, wherein determining comprises:
      initializing a level variable and a count variable for each node in the call tree, wherein the level variable indicates the nodal distance from the focal node to a node in the call tree, and the count variable indicates the number of times that the node makes a direct or indirect call to the focal node,
      traversing the call tree from the focal node to the other nodes in the call tree along a plurality of call paths, wherein traversing includes determining the minimum nodal distance between the focal node and the other nodes, and saving the minimum distance as the level variable, and
      determining the number of times that the other nodes make a direct or indirect call to the focal node, and saving the number as the count variable; and
   for each common ancestor node in the list of common ancestor nodes, determining a call path from the common ancestor node to the focal node.

2. The method of claim 1, further comprising:
   generating a call tree for each common ancestor node using the call path data.

3. The method of claim 2, further comprising:
   storing the common ancestor list and the call tree for each common ancestor node in a data store.

4. The method of claim 3, further comprising:
   retrieving the common ancestor list for the focal node from the data store and displaying the common ancestors on a computer display.

5. The method of claim 4, further comprising:
   selecting one of the common ancestor nodes from the displayed list of common ancestor nodes on the computer display; and
   retrieving the call tree associated with the selected common ancestor node and graphically displaying the call tree on the computer display.

6. The method of claim 5, further comprising:
   printing the displayed call tree associated with the selected common ancestor node; and
   repeating the selecting, retrieving and printing steps for additional common ancestor nodes on the list of common ancestor nodes.

7. The method of claim 1, wherein the determining a list of common ancestor nodes step further comprises:
   initializing a current count variable to one;
   traversing the call tree from the focal node to the other nodes in the call tree along a plurality of call paths; and
   while traversing the call tree, determining whether the count variable of a node is greater than the current count variable and if so then saving the node in the common ancestor list, incrementing the current count variable and marking the node as checked, and continuing to traverse the call tree until the nodes have been checked for common ancestry to the focal node.

8. The method of claim 7, further comprising:
   sorting the common ancestor list first by the lowest level variable and then by the highest count variable; and
   displaying the sorted common ancestor list on a computer display.

9. The method of claim 1, further comprising:
   identifying a plurality of focal nodes among the plurality of nodes in the call tree; and
   for each of the identified focal nodes, determining a list of common ancestor nodes for the focal node and generating a call tree for each of the common ancestor nodes on the list of common ancestor nodes.

10. The method of claim 9, wherein the plurality of focal nodes are identified by a computer system analysis of the call tree.

11. The method of claim 9, further comprising:
    providing a graphical user interface for visually examining the list of common ancestor nodes and the call trees for the identified focal nodes, the graphical user interface comprising a tabular display of the list of common ancestor nodes and a two-dimensional tree display of the call tree data for the common ancestor nodes.

12. The method of claim 1, wherein the traversing the call tree step is limited by a top level value, the top level value causing the traversing step to return to the focal node when the node being traversed has a level variable value that is greater than the top level value.

13. The method of claim 12, wherein the top level value is between 5 and 10.

14. The method of claim 12, wherein the top level value is selected by a human operator.

15. The method of claim 1, wherein the call path data is obtained from a software performance analysis tool.

16. A computer-implemented apparatus for detecting redundant subroutine calls in a software system, comprising:
    means for obtaining call path data for the software system and for storing the call path data into a call tree comprising a plurality of nodes, each node representing a software routine of the software system, the call tree describing the calling paths between the plurality of software routines; and
    a redundant path analyzer for identifying at least one focal node among the plurality of nodes in the call tree, for determining a list of common ancestor nodes for the focal node, and for each common ancestor node in the list of common ancestor nodes, for determining a call path from the common ancestor node to the focal node, wherein the redundant path analyzer is configure to:
    initialize a level variable and a count variable for each node in the call tree, wherein the level variable indicates the nodal distance from the focal node to a node in the call tree, and the count variable indicates the number of times that the node makes a direct or indirect call to the focal node:
    traverse the call tree from the focal node to the other nodes in the call tree along a plurality of call paths, wherein traversing includes:
      determining the minimum nodal distance between the other nodes and the focal node, and saving the minimum nodal distance as the level variable for each node, and
      determining the number of times that the other nodes make a direct or indirect call to the focal node and saving the number as the count variable.

17. The apparatus of claim 16, wherein the redundant path analyzer is configured to generate a call tree for each common ancestor node using the call path data.

18. The apparatus of claim 17, further comprising:
    a data store for storing the common ancestor list and the call tree for each common ancestor node.

19. The apparatus of claim 18, further comprising:
    a computer display for displaying the common ancestor list for the focal node.

20. The apparatus of claim 19, further comprising:
    means for selecting one of the common ancestor nodes from the displayed list of common ancestor nodes on the computer display; and
    means for retrieving the call tree associated with the selected common ancestor node and for graphically displaying the call tree on the computer display.

21. The apparatus of claim 20, further comprising:
    a printer for printing the displayed call tree associated with the selected common ancestor node.

22. The apparatus of claim 16, wherein the redundant path analyzer is configured to:
    initialize a current count variable to one;
    traverse the call tree from the focal node to the other nodes in the call tree along a plurality of call paths; and
    while traversing the call tree, determine whether the count variable of a node is greater than the current count variable and when the count variable of the node is greater than the current count variable, save the node in the common ancestor list, increment the current count variable, mark the node as checked, and continue to traverse the call tree until the nodes have been checked for common ancestry to the focal node.

23. The apparatus of claim 22, further comprising:
    means for sorting the common ancestor list first by the lowest level variable and then by the highest count variable; and
    a computer display for displaying the sorted common ancestor list.

24. The apparatus of claim 16, further comprising:
    means for identifying a plurality of focal nodes among the plurality of nodes in the call tree; and
    for each of the identified focal nodes, using the redundant path analyzer for determining a list of common ancestor nodes for the focal node and for generating a call tree for each of the common ancestor nodes on the list of common ancestor nodes.

25. The apparatus of claim 24, wherein the plurality of focal nodes are identified by a computer system analysis of the call tree.

26. The apparatus of claim. 24, further comprising:

a graphical user interface for visually examining the list of common ancestor nodes and the call trees for the identified focal nodes, the graphical user interface comprising a tabular display of the list of common ancestor nodes and a two-dimensional tree display of the call tree data for the common ancestor nodes.

27. A system, comprising:

one or more processors;

one or more computer-readable storage mediums containing software instructions executable on the one or more processors to cause the one or more processors to perform operations including:

obtaining call path data for the software system and storing the call path data into a call tree comprising a plurality of nodes, each node representing a software routine of the software system, the call tree describing the calling paths between the plurality of software routines;

identifying at least one focal node among the plurality of nodes in the call tree;

determining a list of common ancestor nodes for the focal node, wherein determining comprises:

initializing a level variable and a count variable for each node in the call tree, wherein the level variable indicates the nodal distance from the focal node to a node in the call tree, and the count variable indicates the number of times that the node makes a direct or indirect call to the focal node, traversing the call tree from the focal node to the other nodes in the call tree along a plurality of call paths, wherein traversing includes determining the minimum nodal distance between the focal node and the other nodes, and saving the minimum distance as the level variable, and determining the number of times that the other nodes make a direct or indirect call to the focal node, and saving the number as the count variable; and for each common ancestor node in the list of common ancestor nodes, determining a call path from the common ancestor node to the focal node.

* * * * *